United States Patent
Overberg

(10) Patent No.: US 9,457,358 B2
(45) Date of Patent: Oct. 4, 2016

(54) METHOD FOR DETERMINING THE TORQUE OF A WORM OF A DECANTER

(75) Inventor: Martin Overberg, Herzebrock-Clarholz (DE)

(73) Assignee: GEA Mechanical Equipment GmbH, Oelde (DE)

(*) Notice: Subject to any disclaimer, the term of this patent is extended or adjusted under 35 U.S.C. 154(b) by 1164 days.

(21) Appl. No.: 13/321,839

(22) PCT Filed: May 28, 2010

(86) PCT No.: PCT/EP2010/057377
§ 371 (c)(1),
(2), (4) Date: Nov. 22, 2011

(87) PCT Pub. No.: WO2010/139610
PCT Pub. Date: Dec. 9, 2010

(65) Prior Publication Data
US 2012/0065903 A1 Mar. 15, 2012

(30) Foreign Application Priority Data
May 30, 2009 (DE) .......... 10 2009 023 555

(51) Int. Cl.
*G01L 3/00* (2006.01)
*B04B 1/20* (2006.01)
*F16H 59/46* (2006.01)
(Continued)

(52) U.S. Cl.
CPC ....... *B04B 1/2016* (2013.01); *F16H 61/66272* (2013.01); *F16H 2059/465* (2013.01); *G01L 3/00* (2013.01); *G01L 5/26* (2013.01)

(58) Field of Classification Search
CPC ........... B04B 1/2016; F16H 61/66272; F16H 2059/465; G01L 3/00; G01L 5/26
USPC .......... 702/41; 477/44, 45; 73/114.01; 74/473.1
See application file for complete search history.

(56) References Cited

U.S. PATENT DOCUMENTS 4,327,862 A * 5/1982 Jakobs .................. B04B 1/2016
494/37
4,369,915 A * 1/1983 Oberg et al. ..................... 494/8
(Continued)

FOREIGN PATENT DOCUMENTS

DE   41 07 485   9/1992
DE   196 34 619   3/1997
(Continued)

OTHER PUBLICATIONS

Thomas Broadbent and Sons Limitd Sugar Division., Solving Vibration Problems in Batch Sugar Centrifuges., Jun. 2001.*
(Continued)

*Primary Examiner* — Gregory J Toatley
*Assistant Examiner* — Yoshihisa Ishizuka
(74) *Attorney, Agent, or Firm* — Crowell & Moring LLP

(57) ABSTRACT

A method for determining the torque of a worm of a solid bowl worm centrifuge. The solid bowl worm centrifuge includes a rotatable drum and a rotatable worm, the rotatable worm being rotatable at a different rotational speed than that of the rotatable drum. The rotatable drum and rotatable worm are driven via a gear arrangement and a common single drive motor via at least one belt drive, a driving belt pulley, a driven belt pulley and a belt coupling the pulley. The method steps include determining a slip of the at least once belt drive and calculating a torque based upon the determination of the slip.

3 Claims, 4 Drawing Sheets

(51) Int. Cl.
 *G01L 5/26* (2006.01)
 *F16H 61/662* (2006.01)

(56) References Cited

U.S. PATENT DOCUMENTS

| | | | | |
|---|---|---|---|---|
| 5,011,458 | A | * 4/1991 | Kumm | F16H 9/10 |
| | | | | 474/49 |
| 5,305,648 | A | 4/1994 | Diekhans et al. | |
| 6,525,503 | B2 | * 2/2003 | Fang | H04N 1/1026 |
| | | | | 318/15 |
| 2009/0105059 | A1 | * 4/2009 | Dorry | B04B 1/2016 |
| | | | | 494/37 |

FOREIGN PATENT DOCUMENTS

| | | |
|---|---|---|
| EP | 2 189 795 | 5/2010 |
| GB | 2304902 A * | 3/1997 |

OTHER PUBLICATIONS

German Office Action dated May 30, 2009 issued by the GPTO for DE 10 2009 023 555.8.

International Preliminary Report on Patentabilityt and Translation of the Written Opinion of the International Searching Authority of PCT/EP2010/057377, filed May 28, 2010.

* cited by examiner

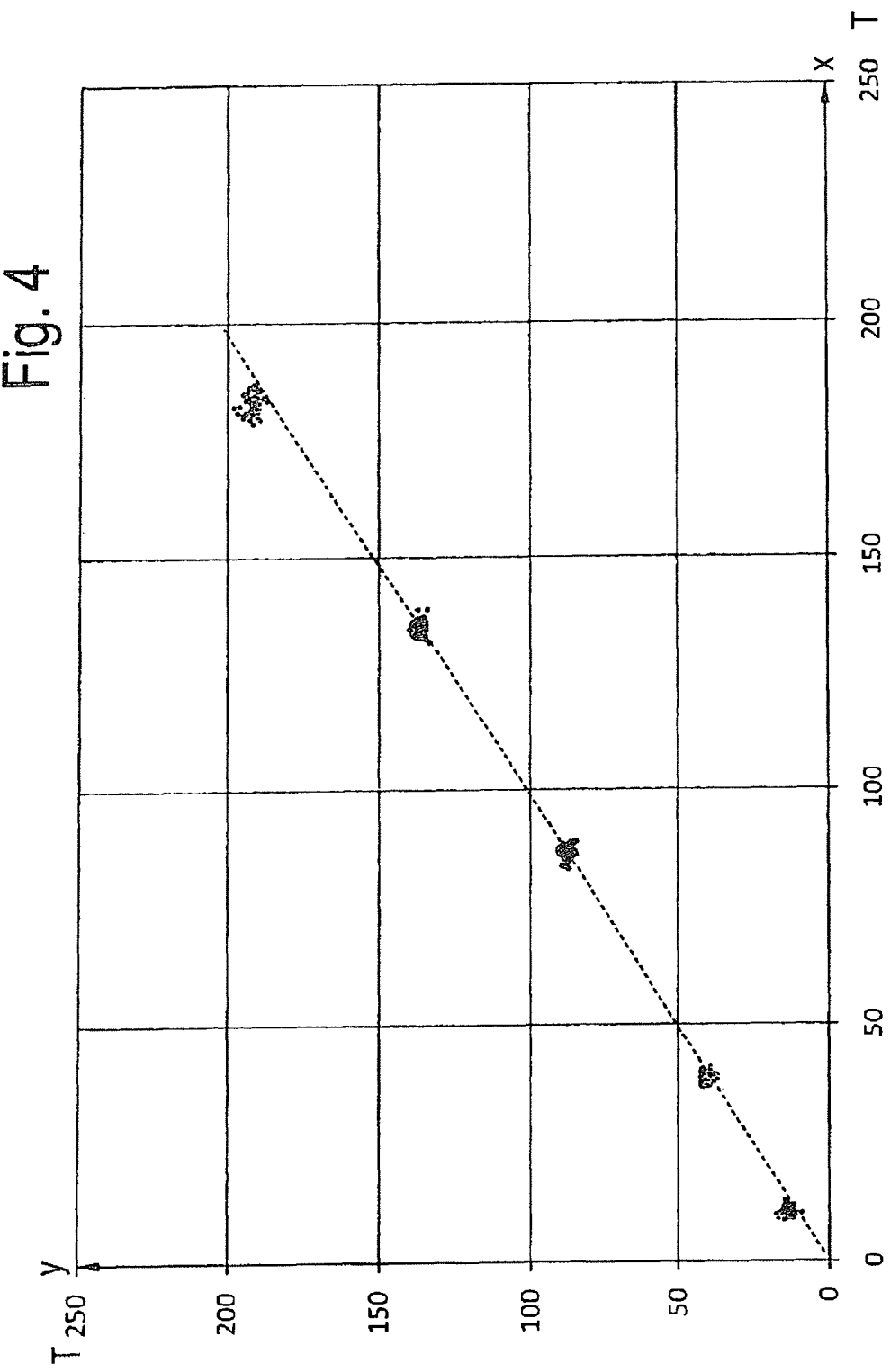

METHOD FOR DETERMINING THE TORQUE OF A WORM OF A DECANTER

This application is a national stage of International Application PCT/EP2010/057377, filed May 28, 2010, and claims benefit of and priority to German Patent Application No. 10 2009 023 555.8, filed May 30, 2009, the content of which Applications are incorporated by reference herein.

BACKGROUND AND SUMMARY

The present relates to a method for determining the torque of a worm of a solid-bowl worm centrifuge having a drum. The worm is rotatable at a different rotational speed from that of the drum, both of which are driven via a gear arrangement by a common single drive motor via one or more belt drives.

Whereas it has been possible to determine the measurement of the worm torque in dual-motor operation via the power consumption or current consumption of the secondary motor, in solid-bowl worm centrifuges with single-motor operation an approximate indication of the worm torque has hitherto been possible only in special cases with constant operating conditions by an estimate on the basis of the main motor current. This estimate is relatively inaccurate and, moreover, is not always or in all cases possible.

The present disclosure relates to embodiments that solve the problem.

The present disclosure thus relates to a method for determining the torque of a worm of a solid bowl worm centrifuge. The solid bowl worm centrifuge includes a rotatable drum and a rotatable worm, the rotatable worm being rotatable at a different rotational speed than that of the rotatable drum. The rotatable drum and rotatable worm are driven via a gear arrangement and a common single drive motor via at least one belt drive, a driving belt pulley, a driven belt pulley and a belt coupling the pulley. The method steps include determining a slip of the at least once belt drive and calculating a torque based upon the determination of the slip.

Additional disclosure may be found in the claims that are part of the present disclosure.

The torque of the worm is determined by determining the slip of a belt drive, by which the torque is introduced into the gear.

This type of determination is simple and uncomplicated, but is also sufficiently accurate for control tasks.

This torque determination by determining the slip of the belt drive can be used for indication purposes and, where appropriate, can also be employed for manual or electronic control or for overload cutoff.

The method for determining torque, according to the present disclosure, includes various drive variations, for example, for various drive and gear embodiments shown in FIGS. 1-3 utilizing a single drive motor.

According to the present disclosure, it may be advantageous if, in determining the torque, an idling torque or the torque present when the step-up $i_{12}$ is determined is taken into account.

Other aspects of the present disclosure will become apparent from the following descriptions when considered in conjunction with the accompanying drawings.

BRIEF DESCRIPTION OF THE DRAWINGS

FIG. 4 is a graph showing a comparison of a measurement (Y) of the torques of a worm and a mathematical determination (X) in accordance with the present disclosure.

DETAILED DESCRIPTION

Figure 1:
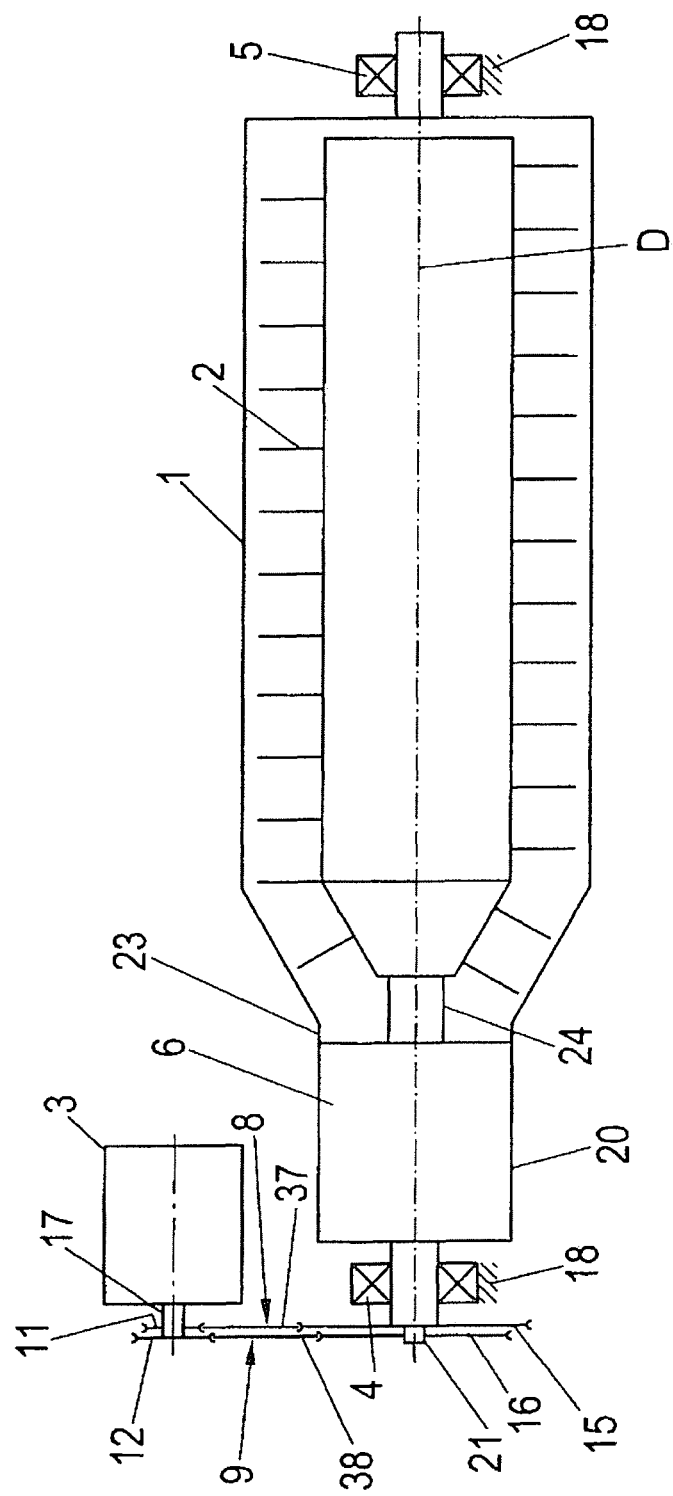
FIG. 1 shows a first solid bowl worm centrifuge, in accordance with the present disclosure.
Figure 2:
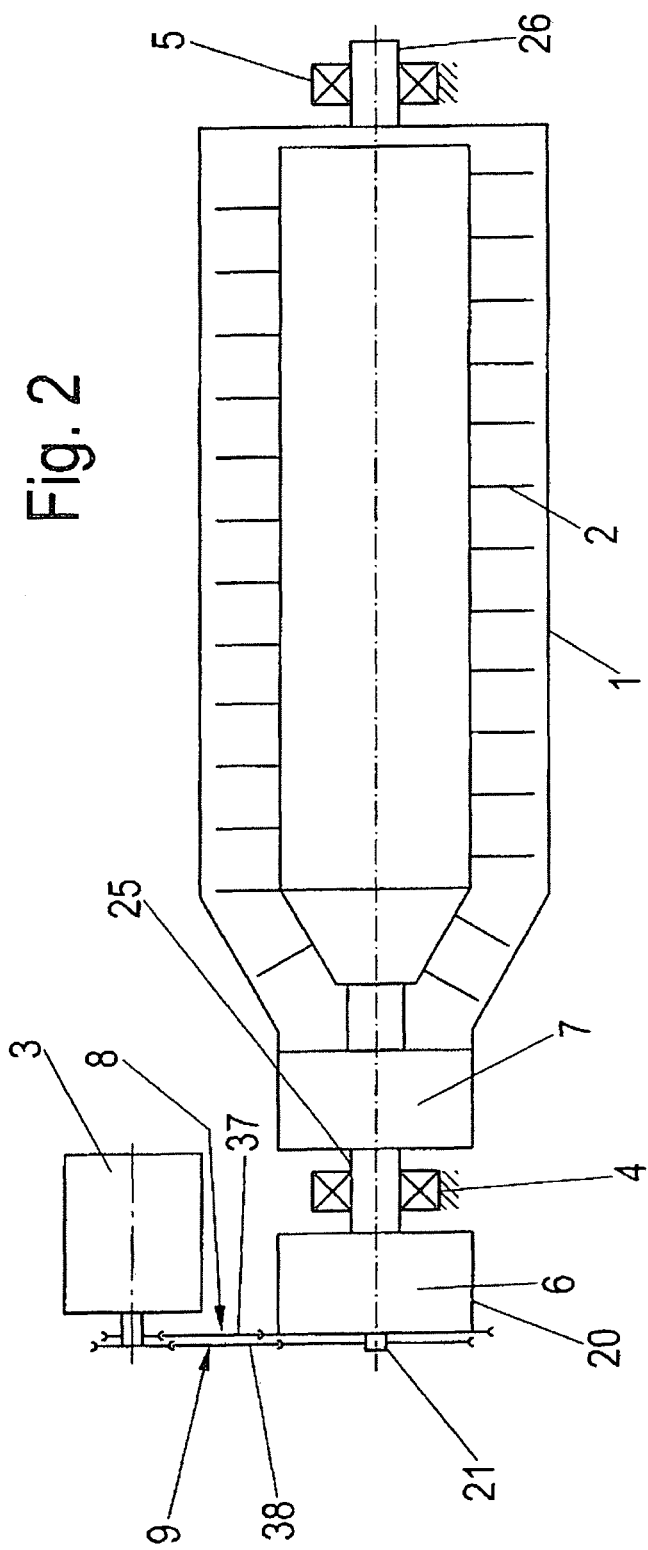
FIG. 2 shows a second solid-bowl worm centrifuge, in accordance with the present disclosure.
Figure 3:
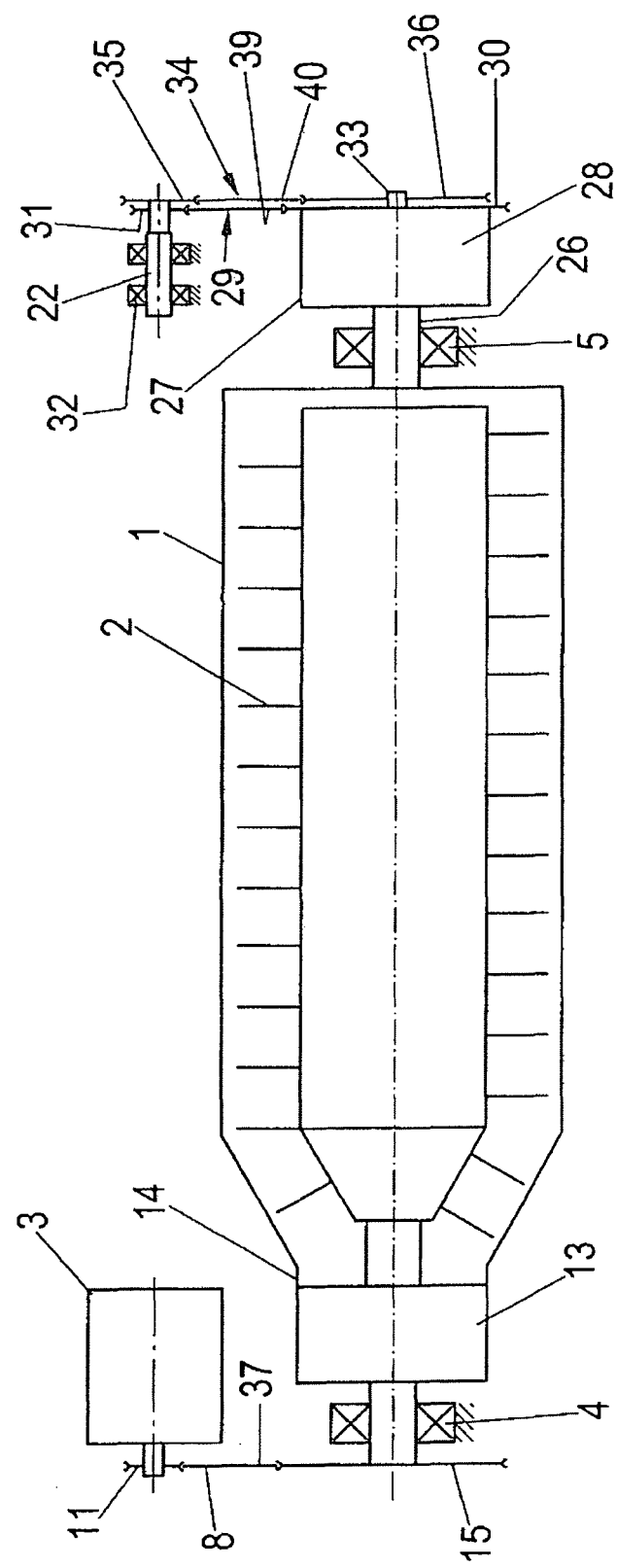
FIG. 3 shows a third solid-bowl worm centrifuge, in accordance with the present disclosure.

FIGS. 1, 2 and 3 each show a solid-bowl worm centrifuge, also called a decanter, with a rotatable drum 1 having, for example, a horizontal axis of rotation D, with a rotatable worm 2 arranged inside the drum 1 and with a drive motor 3 for rotating the drum 1 and the worm 2.

The drum 1 of FIG. 1 is arranged between a drive-side and a drive-remote drum bearing 4, 5, respectively, and is mounted rotatably by these drum bearings 4, 5 on a machine stand/foundation 18.

The drive motor 3 with the output shaft 17, on which two belt pulleys 11 and 12 are arranged, offset axially to one another, serves as the drive.

The first belt pulley 11, as the driving pulley of a first belt drive 8, drives, via a belt 37, a driven belt pulley 15 on a first gear input shaft 20 of a gear stage or gear arrangement 6.

The second belt pulley 12, as the driving pulley of a second belt drive 9, either drives, via a further belt 38 and the driven belt pulley 16, a second gear input shaft 21 of the gear arrangement 6 or exerts a braking action. The belt drive 9, which applies to the small input shaft of the gear, imparts primarily a specific rotational speed to the small input shaft. It can therefore drive or brake.

The gear arrangement 6 transmits torques via suitable gear elements, for example, in the manner of a cyclic gear or in the manner of a planet gear, on output shafts 23, 24 to the drum 1 and the worm 2 and additionally ensures a differential rotational speed between these two rotating elements.

In FIG. 1, the entire gear arrangement 6 is depicted, for example, between the drum bearings 4, 5 as a single gear stage or a plurality of integrated gear stages and serves for generating a rotational speed difference between the spindle 2 and drum 1.

FIG. 2 depicts, for example, a drive device with a gear arrangement having two belt drives 8, 9 and gear stages 6 and 7. One of the two drum bearings 4 is arranged, for example, axially between the two gear stages 6, 7 on a shaft 25, and the other drum bearing 5 is arranged axially outside the other axial end of the drum 2 on a spindle portion 26.

It is within the scope of the present disclosure to have an axial arrangement of a gear arrangement in which the entire gear arrangement is arranged outside an axial region which is delimited (not shown) by the drum bearings 4, 5.

In FIG. 3, a torque for driving the drum 1 by the first belt drive 8 is introduced into a drum hub 13 which has an output shaft 14 for driving the drum 1.

The drum 1 drives the spindle portion 26 which, on that axial side of the drum 1 which faces away from the drum hub 13, rotates a first input shaft 27 of a gear 28 on this side of the drum 1.

This gear 28, furthermore, rotates a shaft 22, mounted by bearings 32, via a belt drive 29 with the driving belt pulley 30 and the driven belt pulley 31 and with a belt 39 connecting these pulleys 30, 31.

The torque is returned from shaft 22 to the gear 28, to a second input shaft 33 of gear 28, via a further belt drive 34 with a driving belt pulley 35, with a driven belt pulley 36 and with a belt 40 coupling these pulleys 35, 36.

Gear 28 generates the differential rotational speed for driving the worm 2 and, via an output shaft (not shown), drives the worm 2.

In the embodiments of the present disclosure, the solid-bowl worm centrifuge is driven by only a single drive motor 3.

In accordance with the present disclosure, the worm torque is determined during operation on the basis of a determination of the slip of at least one belt drive, for example, belt drives 9 and 29 or 34 or belt drives 8, 9, or belt drives 8, 29, 34.

When belt drives operating frictionally, for example flat belts or V-belts, this slip is brought about by the elasticity of the belt.

During normal operation, the slip surprisingly depends almost solely on the transmitted torque and the elasticity of the belt and only to a slight extent on the prestress of the belt, the rubber/pulley coefficient of friction or the rotational speed.

In such a case, for example, only the expansion slip is considered and measured below.

Very high slip occurs, of course, due to too low a prestress or too high a rotational speed because the power cannot be transmitted by friction.

In such case, for example, the expansion slip has added to it a sliding slip which, however, should be avoided during normal operation, since this would lead in the long term to a failure of the belt.

The following equation applies to the slip $\Psi$:

$$\Psi = 1 - \frac{n_2 \cdot d_{w2}}{n_1 \cdot d_{w1}} = 1 - \frac{n_2}{n_1} \cdot i_{12}$$

$n_1$=(measured) rotational speed of the driving belt pulley
$n_2$=(measured) rotational speed of the driven belt pulley
$d_{w1}$=active diameter of the driving belt pulley
$d_{w2}$=active diameter of the driven belt pulley
$i_{12}$=actual step-up.

Thus, in addition to the two rotational speeds of the belt pulleys, either the active diameter of the two belt pulleys or the step-up must be known.

The following also applies to the torque:

T=constant·$\Psi$

On account of manufacturing deviations from the nominal dimension, however, the belt pulleys do not always have the same geometry. In addition, the active diameters also change slightly under different prestress. The actual step-up is, therefore, determined in the mounted state. This takes place by measuring the two belt pulley rotational speeds in the case of known slip:

$$i_{12} = (1 - \Psi) \cdot \frac{n_2}{n_1}$$

It is advantageous if the measurement for determining the actual step-up is initially carried out without a torque load, since, in such a case, for example, the slip is zero. If this is not so, the slip comes into the calculation when the actual step-up is being determined.

In practice, to determine the actual step-up, the decanting centrifuge must first be operated for a short time without any product, so that no torque occurs at the gear output. In this phase, the rotational speeds $n_1$ and $n_2$ are measured and averaged. During this phase, the idling torque of the gear is present at the gear input and is taken into account when the actual step-up is calculated.

The idling torque may be obtained from experimental values or determined by calculation.

The actual step-up will change with time on account of wear of the belt pulleys and because of diminishing prestress. It, therefore, has to be newly determined regularly. This is due to the aging, expansion and abrasion of the belts 37 to 40.

A simple indication of torque, for example, according to the following, is thus possible by this technique:

1st stage: T<30%
2nd stage: 30%<T<70%
3rd stage: 70%<T<100%
4th stage: overload

The indication can be given by control fields and warning signals, for example in the form of a light.

Further measurement values, such as rotational speeds of the main motor 3 and of, for example, the gear input shafts 20, 21, supplement the torque indication and ensure additional indication accuracy. They can be incorporated additionally into the calculation of the slip.

By the control monitoring simplified in this way, it becomes possible, for example, in accordance with the present disclosure, to estimate the load upon one or more of the belt drives 8, 9, 29, 34 and one or more of the belts 37-40 or one or more of the gears 6, 7, 28 by cost-effective measurement simulation.

FIG. 4 shows a comparison of measurement Y of the torques of a worm 2 with the mathematical determination X done according to the present disclosure of the torque. Identity is readily evident.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A method for determining a torque of a worm of a solid bowl centrifuge, the solid bowl worm centrifuge including a rotatable drum and a rotatable worm, the rotatable worm being rotatable at a different rotational speed than that of the rotatable drum, the rotatable drum and rotatable worm being driven via a gear arrangement and a common single drive motor via at least one belt drive, a driving belt pulley, a driven belt pulley and a belt coupling the pulley, the method steps comprising:
   determining a slip $\Psi$ of the at least one belt drive; and
   calculating the torque of the worm based upon the determination of the slip;
   wherein the slip $\Psi$ determined according to the following formula:

$$\Psi = 1 - \frac{n_2 \cdot d_{w2}}{n_1 \cdot d_{w1}} = 1 - \frac{n_2}{n_1} \cdot i_{12}$$

in which
$n_1$=(measured) rotational speed of the driving belt pulley
$n_2$=(measured) rotational speed of the driven belt pulley
$d_{w1}$=active diameter of the driving belt pulley
$d_{w2}$=active diameter of the driven belt pulley $i_{12}$=actual step-up, $n_1$, $n_2$, $d_{w1}$, $d_{w2}$ and $i_{12}$ being determined by measurement, and the torque T being determined from this slip as follows:

$$T = \text{constant} \cdot \Psi;$$

further comprising a step of determining the actual step-up, wherein the centrifuge is first operated for a short time without any product, and the rotational speeds $n_1$ and $n_2$ are measured and averaged, wherein the step of determining the actual step-up is taken into account in the calculation of the torque;

further comprising a step of using the calculation of the torque for manual control and electronic control and overload cutoff of the solid bowl worm centrifuge;

and further comprising a step of using the calculation of the torque for indicating different stages of the torque including stages indicating respective percentages of the torque and including a stage that is an overload.

2. The method as claimed in claim 1, wherein the step of determining the actual step-up is repeated at intervals.

3. The method as claimed in claim 1, further comprising a step of taking into account an idling torque or the torque present when an actual step-up is determined when determining the torque.

* * * * *